United States Patent [19]

Jos et al.

[11] Patent Number: 4,954,213
[45] Date of Patent: Sep. 4, 1990

[54] WRAP-AROUND RECOVERABLE SLEEVE

[75] Inventors: Doucet Jos, Kessel-Lo; Mendes L. Neves, Begijnendijk, both of Belgium

[73] Assignee: Raychem Corporation, Menlo Park, Calif.

[21] Appl. No.: 263,571

[22] Filed: Oct. 27, 1988

[30] Foreign Application Priority Data

Oct. 27, 1987 [GB] United Kingdom ................ 8725146

[51] Int. Cl.$^5$ ............................................. H01B 13/06
[52] U.S. Cl. ........................................ 156/49; 156/54; 156/55; 156/86; 174/DIG. 8; 428/35.1; 428/192
[58] Field of Search .......................... 174/DIG. 8, 92; 138/128, 156; 428/35.1, 913, 192; 219/535, 544; 156/54, 55, 86, 49

[56] References Cited

U.S. PATENT DOCUMENTS

| 4,436,566 | 3/1984 | Tight, Jr. ............................. 428/192 |
| 4,448,824 | 5/1984 | Holmes et al. ....................... 428/34.9 |
| 4,675,512 | 6/1987 | Doucet et al. ....................... 219/535 |
| 4,714,277 | 12/1987 | Bachel et al. ................. 174/DIG. 8 |

Primary Examiner—James Seidleck
Attorney, Agent, or Firm—A. Stephen Zavell; Herbert G. Burkard

[57] ABSTRACT

A wrap-around sleeve for environmental sealing of cables etc. comprises a first web of shrinkable material, preferably electrically-heatable and having closure rails at opposing edge portions which can be held together to maintain the sleeve in a wrapped configuration. A second web extends from one of the rails within the sleeve, it has a length less than the length of the sleeve, and it can act as a localized cable build-up, or help to seal between branching cables.

20 Claims, 10 Drawing Sheets

WRAP-AROUND RECOVERABLE SLEEVE

This invention relates to a wrap-around, dimensionally-recoverable sleeve, particularly for environmentally protecting cable splices such as telecommunications cable splices.

BACKGROUND OF THE INVENTION

It is frequently necessary to provide environmental protection around a cable splice to keep contaminants such as water away from the spliced conductors. In the case of telecommunications cables and other multiconductor cables a large splice bundle will be produced, joining the two cables and some mechanical protection around it is often required. Thus, the enclosure (referred to as a splice case) may comprise a liner, which is shaped to encompass the bulky splice bundle and to taper down to the cables at either end, and an impervious outer layer. In recent years this impervious outer layer has been provided by a dimensionally-recoverable, generally heat-shrinkable, sleeve. Such a sleeve is installed around the splice and liner and then shrunk down to engage the liner and the spliced cables. The sleeve may be tubular (i.e. closed in cross-section) in which case it is slid along one of the cables until it overlies the splice, or it may be of the wrap-around type, in which case it is wrapped directly around the splice and secured in the wrapped around configuration. An advantage of dimensional recovery is that the sleeve can be supplied oversized in order that it be an easy fit, and in order that close manufacturing tolerances be avoided. When approximately in position it is caused dimensionally to recover (generally to shrink radially) to engage the cables either side of the splice and optionally also the splice and liner, thereby forming an environmental seal. Recovery is conveniently brought about by heating, and the sleeve may be internally coated with a heat-activatable sealing material, which will be activated by the same heating step that was carried out to induce recovery. Such recoverable sleeves are well known in the telecommunications cable accessories art, and are marketed under the Raychem Trade Marks XAGA and VASM. Wrap-around sleeves are disclosed in GB 1155470 (Raychem).

Traditionally, heat-recoverable sleeves have been heated by use of an open-flame torch although electrical heating has been proposed for use in dangerous environments. Examples of electrically heatable sleeves are given in EP 0158519 (Raychem) and EP0117762 (Raychem).

Problems with wrap-around, recoverable sleeves may arise where a larger transition has to be covered ("transition" refers to a difference in diameter for example between cables and splice bundle) or where branching cables have to be sealed. In each of these cases it may be necessary to employ much adhesive in order to provide a reliable seal; and much adhesive may be difficult to activate since the quantity of heat required may be large, and the adhesive may be shielded from an external heat source. In the first of these cases a difficulty may arise because a sleeve of high recovery may need to be used in order that it surround the bulky splice before shrinkage and engage the small cables after shrinkage. Such a sleeve may be difficult to produce especially if it is to comprise a conductive polymer having the desired self-heating properties. An alternative solution may be to build-up the cable to a suitable diameter with adhesive, but then problems of adhesive activation may become worse. In the second case difficulty arises because two side-by-side, branching, cables present a rentrant or concave cross-section to the surrounding sleeve. Tent-shaped voids will thus remain between the shrunk sleeve and the underlying pair of cables, through which contaminants can enter the splice case. Such voids may be filled with adhesive, but that again may give rise to the problem of activating a mass of adhesive that is shielded from any external heat source. An excellent branching technique is disclosed in GB 1604981 (Raychem), and in EP 0151512 (Raychem). The latter relates to electrical heating using a specially designed and perhaps rather expensive clip.

A solution to the problem of the need for a high recovery ratio in an electrically-heatable sleeve that cannot be highly expanded is given in EP 0117762 (Raychem). There is a sleeve shown which when in the wrapped configuration is of, say, frusto-conical shape. In the unwrapped configuration, the sleeve therefore has closure members which are non-parallel. Thus a large difference between the unrecovered dimension of one end and the recovered dimension of an opposite end results from the combination of a moderate recovery ratio and an initial difference in size. That solution is not, however, ideal since any given sleeve cannot be used over a wide range of cable sizes and shapes, and such sleeves are difficult to manufacture having tapers at both ends.

SUMMARY OF THE INVENTION

We have now discovered that problems such as those discussed above can be solved by employing a wrap-around sleeve part of which acts as an extra cable wrap (for example to compensate for small cable size) or which supplies or conducts heat into a cable branch-off region.

Thus, the invention provides a wrap-around sleeve suitable for enclosing a cable splice, which comprises:
  a first web of dimensionally-recoverable material that can substantially surround the splice;
  a first closure member at a first longitudinal edge portion of the first web;
  a second closure member at a second longitudinal edge portion of the first web, the first and second closure members being capable of being held together to maintain the sleeve in a wrapped-around configuration around the splice; and
  a second web of material that extends from the first closure member in a direction substantially away from that closure member, and has a width along the closure member that is less than (preferably less than 40% of) the length of that closure member.

The invention also provides a method of enclosing a splice between cables which comprises:
 (1) wrapping around the splice a sleeve according to the invention, the sleeve being positioned such that the second web is positioned around one of the cables adjacent the splice; and
 (2) causing dimensional-recovery of the first web.

The invention further provides a method of enclosing a branch-off splice in which at least two cables are joined together side-by-side, which comprises:
 (1) wrapping around the splice a sleeve according to the invention, the sleeve being positioned such that the second web passes between the two side-by-side cables; and
 (2) causing dimensional-recovery of the first web.

DETAILED DESCRIPTION OF THE INVENTION

Since the sleeve of the invention will be particularly useful for environmental protection of cable splices where cables enter a splice from two opposite sides, we prefer that the sleeve has two said second webs, positioned at respective ends of the closure member. In this way each web may serve to build up a cable to a larger diameter, leaving the splice bundle between them without any such extra layer. Where, however, the sleeve is used to cover a branch splice where one large cable splits into two smaller cables it may be desirable to provide only one second web. In this case a second web may not be required around the single large cable, but may be required between the branching pair to help heat-activation of any adhesive present.

The second web is preferably positioned at an end portion of the closure member from which it extends, generally at an extreme end.

In addition to the second web, the sleeve may be provided with a flap that extends substantially the length of the first and second closure members, and that underlies them and bridges the gap between them when the sleeve is in the wrapped-around configuration. Such a flap may comprise a sealing material, for example a hot-melt adhesive in which case it should have a sufficiently high viscosity at the installation temperature of the sleeve that it does not flow excessively. The flap may comprise a portion of the first web between its extreme edge and the adjacent closure member.

The first and second webs are preferably integral, although they may be bonded or welded together or even initially separate. Thus, the sleeve may be stamped or otherwise cut or moulded etc from a single sheet of material, its shape (when flat) preferably being that of a rectangle having a smaller rectangle removed either from one corner (leaving a first web with a single second web) or from one edge (leaving a first web and a two second webs at opposite edges of the first web).

The closure members may comprise protrusions upstanding from the first web and extending along longitudinal edge portions of the web. The protrusions may be undercut near their base such that a channel that is C-shaped in cross-section can be slid over them when they are brought together, and from which the protrusion cannot pull out. Such a wrap-around closure is known (for other sleeves) as a rail-and-channel closure and is described and illustrated in GB 1155470. An alternative way of making closure members is to fold sheet material into the desired shape, preferably around longitudinal support members for example as described in EP0117762.

The sleeve preferably includes a heater to cause heat-recovery and/or adhesive activation. The heater is preferably self-contained, and preferably electrical. The material of the first web preferably has the dual function of providing an environmental barrier and of generating the heat required for its own shrinkage when it is connected to a source of electrical power. Reference is therefore made in this specification to the first web (optionally) including an electrical heater since it has the additional function of environmental protection. In contrast, reference is made to the second web (optionally) comprising an electrical heater since it may have no function other than providing heat. In general, however, the first and second webs are preferably substantially identical and may be merely different parts of a single sheet of conductive polymeric material provided on either side with electrodes. The second web may therefore have the additional function of cable build-up.

The electrodes may be in the form of metal mesh or perforated sheet, allowing their expansion to render the webs (particularly the first and perhaps the second) dimensionally recoverable, and to allow subsequent shrinkage.

BRIEF DESCRIPTION OF THE DRAWINGS

The invention is further illustrated by the accompanying drawings, in which.

Figure 1:
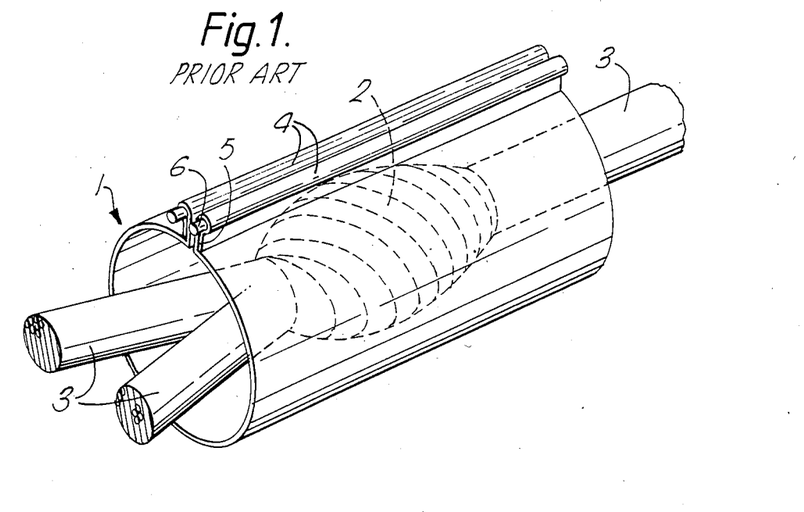
FIG. 1 shows a prior art electrically heat-shrinkable wrap-around sleeve.

FIG. 1 shows a prior art electrically heat-shrinkable sleeve 1 positioned around a splice 2 between telecommunications cables 3. The sleeve is shown in its wrapped around configuration around the splice, but before shrinkage. After shrinkage it will engage at least the cables either side of the splice to form a tight environmental seal, known as a splice case. Longitudinal edge portions of the sleeve carry closure members 4 that will be held together by some means (not shown) during shrinkage. The closure members may be formed by folding parts of the sleeve 5 around support means 6. The sleeve is electrically heat-shrinkable and constitutes its own heater; it comprises an expanded conductive polymer material having mesh electrodes either side thereof such that when a source of electrical power is connected between the electrodes current flows through the thickness of the material causing it to become hot and shrink. The support means 6 may provide busses to supply electrical power to the electrodes.

The remaining Figures illustrate sleeves of the invention, which may be particularly useful for sealing splices in fibre optic cables. Such splices are likely to be large compared to the size of the cables.

Figure 2:
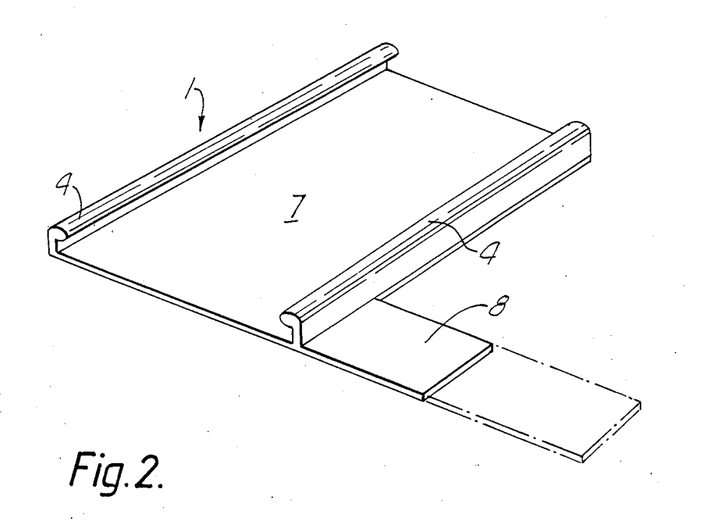
FIG. 2 shows a wrap-around sleeve according to the invention having first and second webs.

FIG. 2 shows a recoverable, preferably electrically recoverable, sleeve 1 having closure members 4, a first web 7 that can surround a cable splice, and a second web 8 that extends substantially perpendicular from one of the closure members and has a width along that closure member which is less than 40% of the length of that closure member. Reference is to be made to the description concerning FIG. 10 with regard to the dotted lines.

Figure 3:
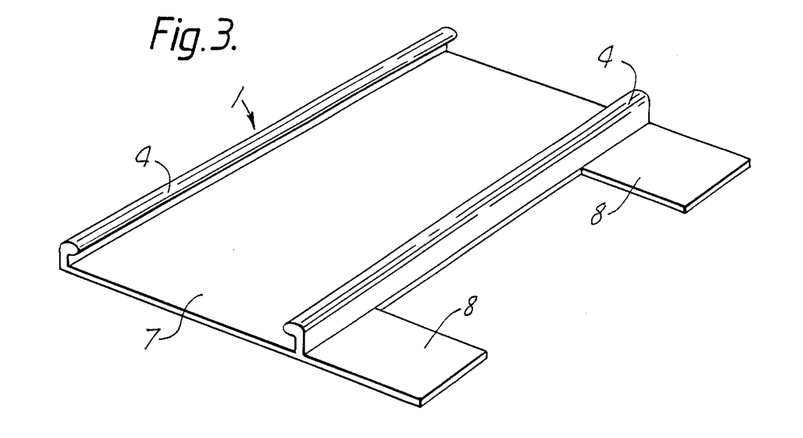
FIG. 3 shows a wrap-around sleeve having two second webs.

The sleeve illustrated in FIG. 3 has two such second webs 8.

Figure 4:
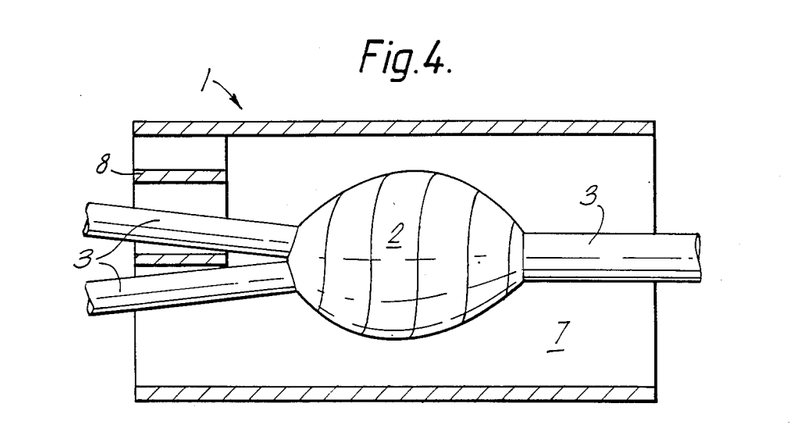
FIG. 4 shows the sleeve of FIG. 2 in use around a branched cable splice.

FIG. 4 shows in longitudinal cross-section the sleeve of FIG. 2 around a splice 2 between cables 3. The splice is a branched splice in which one cable branches into two. This splice configuration is commonly known as "one in-two out". A problem may exist in sealing around the two branching cables at the left-hand side of the splice. As can be imagined from FIG. 1 where the same splice configuration is shown, the shrinking sleeve will not properly seal around the pair of cables due to their partially concave combined cross-section. The present invention is able to overcome this problem by providing sufficient adhesive to fill the voids that would otherwise exist around the cables and by employing the second web 8 to aid its heat-activation. The web 8 preferably comprises a heater which can therefore directly provided heat between the branching cables. It is wrapped between them in the drawing. Alternatively it may simply act as a heat conductive path to conduct heat form the first web 7 or from an independent external heater. Adhesive may be supplied as part of the sleeve, for example as a coating on the first and/or second webs, or merely affixed adjacent the first and/or second webs. Alternatively such adhesive may be supplied separately and wrapped around the cable or otherwise placed in position before installation of the sleeve. The seal between the cables may be enhanced if desired by the use of a branch-off clip which brings together or maintains together circumferentially spaced portions of the sleeve between the branching cables. Such a clip is preferably placed on an end of the sleeve before heat-shrinkage, as disclosed in GB 1604981.

Figure 5:
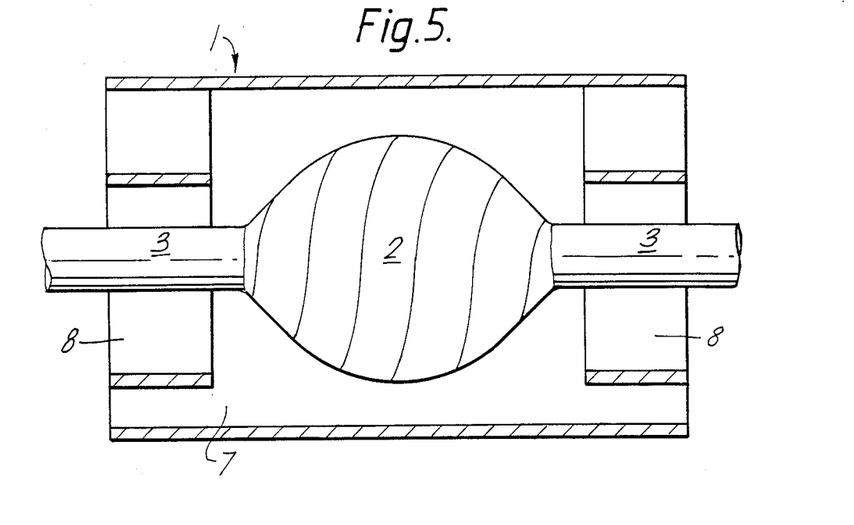
FIG. 5 shows the sleeve of FIG. 3 in use around a cable splice of large transition.

FIG. 5 shows in longitudinal cross-section use of the sleeve 1 of FIG. 3 around a splice 2 between two cables 3. The sleeve has two second webs 8, each of which serves to build-up the cable diameters. In this way the shrinkage ratio of the first web 7 may be reduced. This may be desirable when the web 7 is electrically shrinkable and comprises a conductive polymer material having a positive temperature coefficient of resistance, and therefore being self-regulating. High shrink ratios can be difficult to achieve in such materials, and an ability of the planar electrodes desirably used with them to collapse is also difficult to achieve; the present invention provides a convenient way of avoiding such problems.

Figure 6:
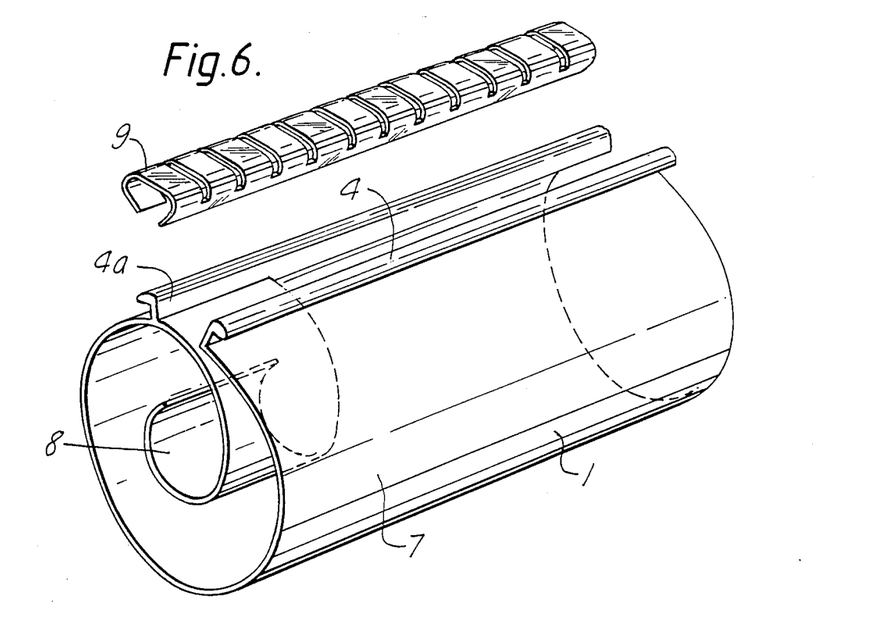
FIGS. 6 and 7 show a sleeve of the invention in perspective.

FIG. 6 shows in perspective view a sleeve of the invention together with a closure channel 9 which can be slid over the closure members 4 to hold them together. The second web 8 is shown curling around in a direction that continues the curvature of the first web 7, but it may be preferred for it to be folded back under the closure member 4a and curl in the opposite way. The closure members need not have the shape or construction illustrated, and in particular they may be formed by wrapping a part of the sheet around support members. The length of the second web 8 will depend on the desired use. For example, branch-offs of three or more cables can be sealed by employing longer second webs.

Figure 7:
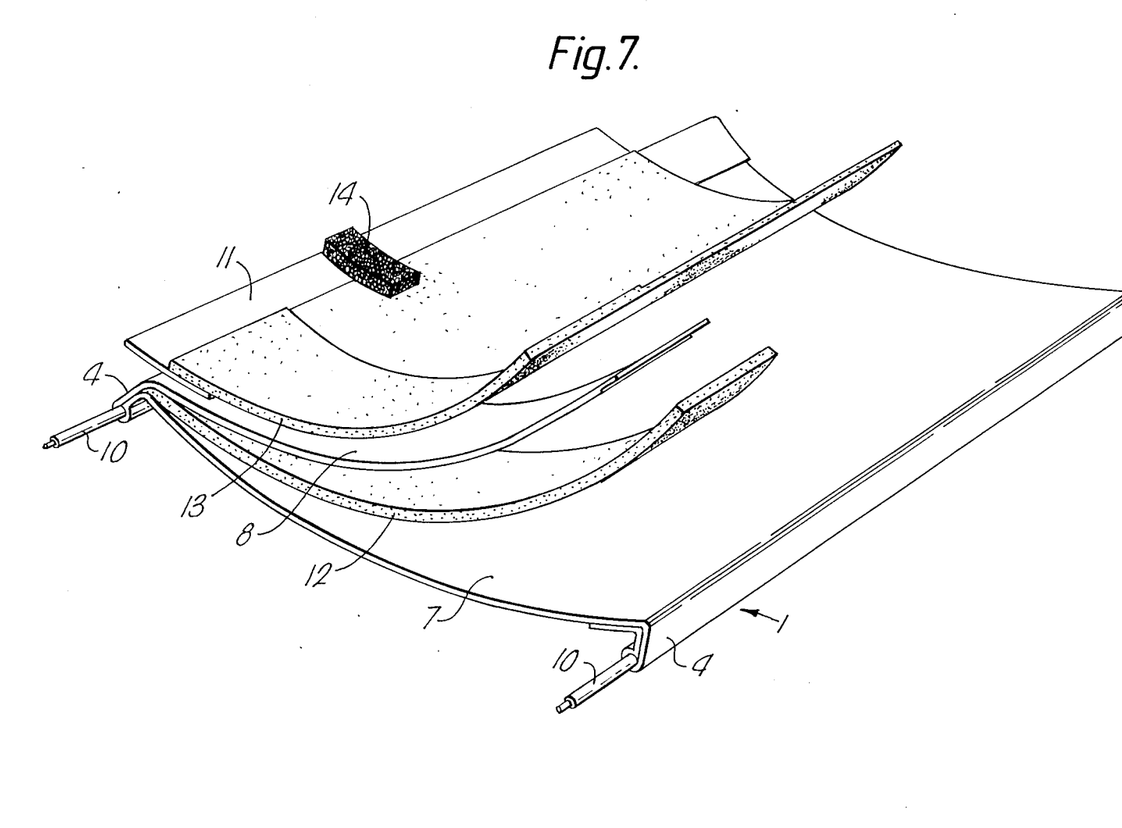

FIG. 7 shows a preferred design employing these two alternatives. The sleeve can be seen to be wrapped around support members in such a way that one of the support members contacts one surface of the sleeve, and the other contacts the opposite surface. In this way, the support members can act as busses to supply electric power between sheet electrodes provided on respective surfaces of the sheet. The electrodes are preferably covered over the greater part of their outwardly facing surfaces with an electrically-insulating layer; such layer being removed where contact with the busses 10 is required. The second web 8 can be seen to be folded back, initially at least, along the surface of the first web. The first and second webs are integral and therefore a single set of electrical connections to a power supply will cause both the first and second webs to be powered. Alternatively the two webs could be electrically interconnected within the sleeve.

The sleeve is also provided with layers of adhesive 12 and 13 and with a flap 11 which can seal any gap that may exist between the closure members 4 when the sleeve is in the wrapped around configuration. The flap may carry means such as a foam block 14 which can bear against the splice 2 or an internal liner to force the flap 11 into sealing engagement with the underside of the opposite longitudinal edge of the sleeve.

Figure 8A:
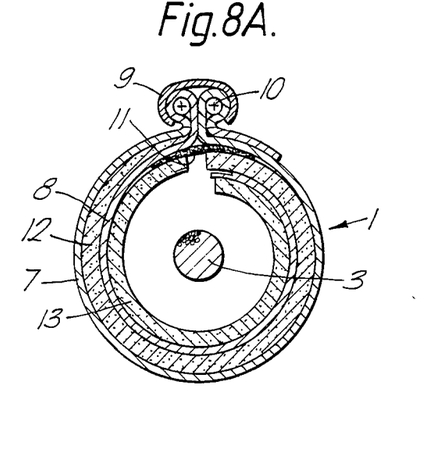
FIGS. 8a and 8b show cross-sections of a sleeve around a cable, before and after heat shrinkage.
Figure 8B:
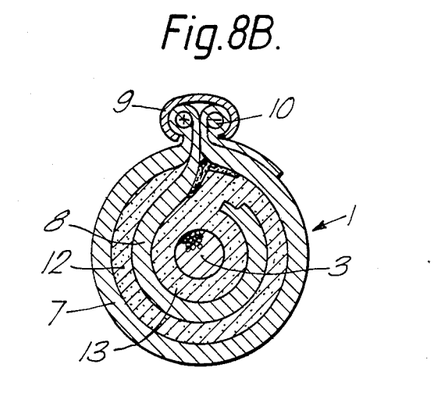

FIGS. 8a and 8b show transverse cross-sections through a cable 3 surrounded by a sleeve 1 of the invention. FIG. 8a shows the situation before heat-recovery. The sleeve 1 is held in the wrapped configuration by closure channel 9. The first web 7 can be seen to surround the cable, and the second web 8 provides a cable build-up, and/or also provides direct electrical heating between the two layers of adhesive 12 and 13.

The sealed cable after recovery is shown in FIG. 8b. The thickness of adhesive can be seen to be quite large, and the benefit of applying heat directly within its bulk (rather than relying on heat conduction from the outer sleeve) can be appreciated.

Figure 9A:
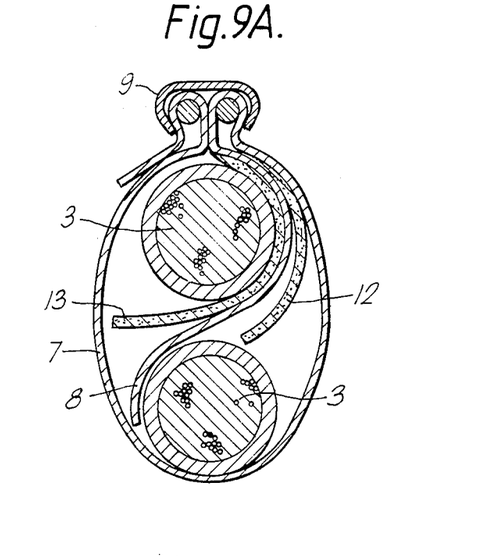
FIGS. 9a and 9b show cross-sections of a sleeve around branching cables, before and after recovery.
Figure 9B:
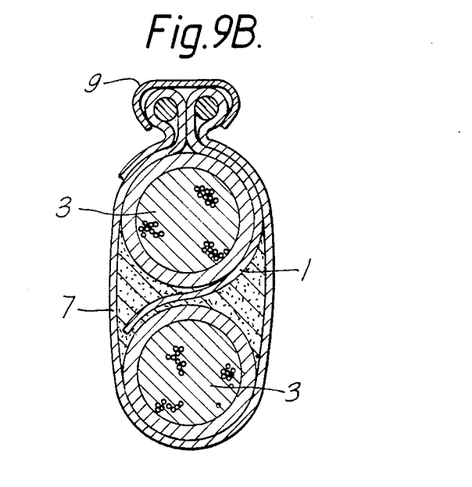

FIGS. 9a and 9b are analogous to FIGS. 8a and 8b, but show the sealing of a branched splice.

Figure 10:
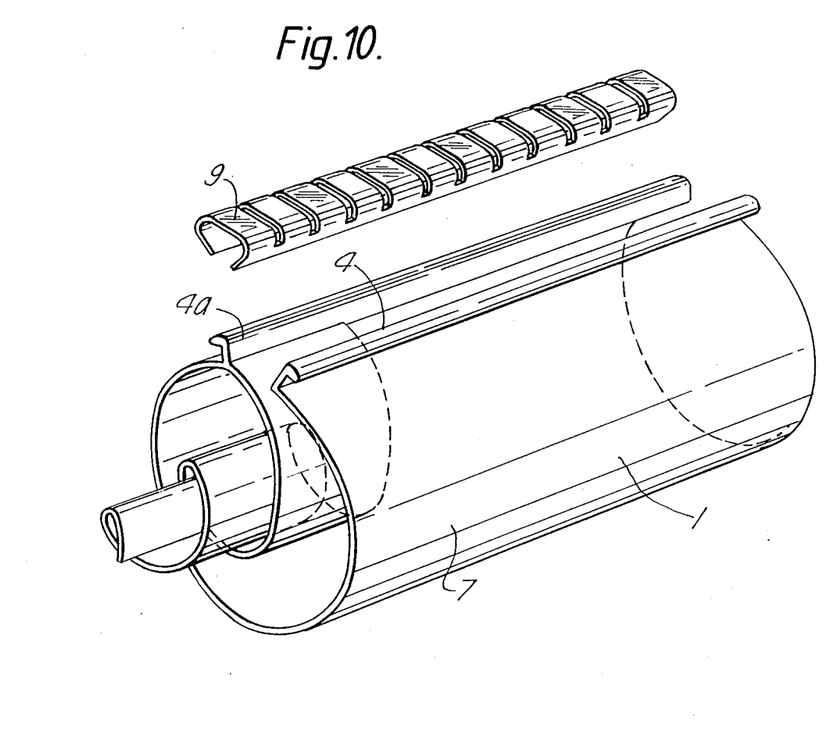
FIG. 10 shows a variation of the sleeve of FIG. 6.

The sleeve shown in FIG. 10 is similar to that shown in FIG. 6, except the second web extends substantially perpendicular to the first closure member but has a component of extension that is longitudinal with respect to the sleeve, i.e. generally substantially parallel to the first closure member. When the second web is curled up (as shown) it may provide an extension, generally tubular, to the sleeve. It may extend into the sleeve instead. One use of the sleeve shown in FIG. 10 is for cable repair or other sealing in a confined space, for example into a duct. The first web may be installed in a position on a cable outside of a duct, with the second web extending into the duct. The sleeve when opened flat may be as shown in FIG. 2 following the dotted lines for the second web.

For the avoidance of doubt, it is here pointed out that the invention provides various articles and methods for sealing substrates such as cables (in particular for sealing cable branch-offs or for sealing cable splices having large transitions or for cable build-up) particularly by means of first and second webs of material. Any one or more of the various features disclosed herein, for example sleeve shapes, heating techniques, closure designs, and branch-off techniques may be chosen.

We claim:

1. A method of enclosing a splice between cables which comprises:
   (1) wrapping around the splice a sleeve, said sleeve comprising:
   a first web of dimensionally-recoverable material that can substantially surround the splice;
   a first closure member at a first longitudinal edge portion of the first web;
   a second closure member at a second longitudinal edge portion of the first web, the first and second closure members being capable of being held together to maintain the sleeve in a wrapped-around configuration around the splice; and
   a second web of material that extends from the first closure member in a direction substantially perpendicular to the running length of that closure member, as determined when the closure member is in flat sheet form, and has a width extending along the running length of that closure member that is less than the length of the closure member, the sleeve being positioned such that the second web is positioned around one of the cables adjacent the splice; and (2) causing dimensional-recovery of the first web.

2. A method according to claim 1, in which the second web has a width that is less than 40% of the length of the closure member.

3. A method according to claim 2, in which the second web is positioned at an end portion of the closure member.

4. A method according to claim 3, including two said second webs, positioned at respective ends of the closure member.

5. A method according to claim 1, including a flap that extends substantially the length of the first and second closure members, and that underlies them and bridges a gap between them when the sleeve is in the wrapped-around configuration.

6. A method according to claim 1, in which the first and second webs are integral with or bonded or welded to one another.

7. A method according to claim 1, in which each closure member comprises a protrusion upstanding from the web and extending along longitudinal edge portions of the web.

8. A method according to claim 7, in which the protrusions are formed by folding sheet material around a longitudinally extending support member.

9. A method according to claim 1, including a hot-melt adhesive at a surface that will be inwardly facing when the sleeve is in a wrapped-around configuration.

10. A method according to claim 1, in which the cables are telecommunications cables.

11. A method of enclosing a branch-off splice in which at least two cables are joined together side-by-side, which comprises:

(1) wrapping around the splice a sleeve, said sleeve comprising:

a first web of dimensionally-recoverable material that can substantially surround the splice;

a first closure member at a first longitudinal edge portion of the first web;

a second closure member at a second longitudinal edge portion of the first web, the first and second closure members being capable of being held together to maintain the sleeve in a wrapped-around configuration around the splice; and a second web of material that extends from the first closure member in a direction substantially perpendicular to the running length of that closure member, as determined when the closure member is in flat sheet form, and has a width extending along the running length of that closure member that is less than the length of the closure member, the sleeve being positioned such that the second web passes between the two side-by-side cables; and (2) causing dimensional-recovery of the first web.

12. A method according to claim 11, in which the cables are telecommunications cables.

13. A method according to claim 11 in which the second web has a width that is less than 40% of the length of the closure member.

14. A method according to claim 13 in which the second web is positioned at an end portion of the closure member.

15. A method according to claim 14 including two said second webs, positioned at respective ends of the closure member.

16. A method according to claim 11 including a flap that extends substantially the length of the first and second closure members, and that underlies them and bridges a gap between them when the sleeve is in the wrapped-around configuration.

17. A method according to claim 11 in which the first and second webs are integral with or bonded or welded to one another.

18. A method according to claim 11 in which each closure member comprises a protrusion upstanding from the web and extending along longitudinal edge portions of the web.

19. A method according to claim 18 in which the protrusions are formed by folding sheet material around a longitudinally extending support member.

20. A method according to claim 11 including a hot-melt adhesive at a surface that will be inwardly facing when the sleeve is in the wrapped-around configuration.

* * * * *